United States Patent
Sweeney

(10) Patent No.: US 10,442,087 B1
(45) Date of Patent: Oct. 15, 2019

(54) APPLYING FLUORESCENT MARKINGS TO ITEMS TO AID ROBOTIC HANDLING

(71) Applicant: Amazon Technologies, Inc., Seattle, WA (US)

(72) Inventor: Andrew M. Sweeney, Franklin, MA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 15/277,587

(22) Filed: Sep. 27, 2016

(51) Int. Cl.
  *B25J 9/16* (2006.01)
  *G05B 19/12* (2006.01)
  *B65G 1/137* (2006.01)
  *B25J 19/02* (2006.01)

(52) U.S. Cl.
  CPC .......... *B25J 9/1697* (2013.01); *B25J 19/021* (2013.01); *B65G 1/137* (2013.01); *G05B 19/124* (2013.01); *G05B 2219/37558* (2013.01); *Y10S 901/47* (2013.01)

(58) Field of Classification Search
  USPC ........................................................ 700/218
  See application file for complete search history.

(56) References Cited

U.S. PATENT DOCUMENTS

| 4,853,771 A * | 8/1989 | Witriol .................. B25J 9/1697 235/375 |
| 9,916,506 B1 * | 3/2018 | Davis .................. G06K 9/00671 |
| 2012/0296474 A1 * | 11/2012 | Irie ........................ B25J 9/1687 700/259 |
| 2015/0032252 A1 * | 1/2015 | Galluzzo .................. B25J 5/007 700/218 |
| 2015/0232304 A1 * | 8/2015 | Monux Belloso ...... B66C 13/46 414/800 |
| 2016/0243590 A1 * | 8/2016 | Crest .................... B25J 15/0057 |
| 2016/0271796 A1 * | 9/2016 | Babu .................... G05D 1/0094 |

* cited by examiner

*Primary Examiner* — Kyle O Logan
(74) *Attorney, Agent, or Firm* — Thomas | Horstemeyer, LLP

(57) ABSTRACT

Disclosed are various embodiments for using fluorescent coatings to aid in robotic handling of items. In one embodiment, an image is captured. An item in the image is recognized from the image based at least in part on a fluorescence of the item relative to its surrounding environment caused by exposure of a fluorescent marking of the item to a radiation source. A robotic arm is operated relative to the item in response to recognizing the item.

20 Claims, 6 Drawing Sheets

APPLYING FLUORESCENT MARKINGS TO ITEMS TO AID ROBOTIC HANDLING

BACKGROUND

Materials handling facilities, such as fulfillment centers, may deploy robotic technology. For example, many facilities now use robotic drive units to automatically maneuver item storage racks to a central location. Some tasks are seen as difficult for robotic technology to perform.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to automating fulfillment centers and/or other materials handling facilities with robotic technology. For example, robotic arms may be used in order to pick items from, or to store items to, shelves, totes, or other storage location. However, computer vision technology is not yet advanced enough in order to automatically recognize items and their orientations while in totes, or shelves, in bins, or at other storage locations.

Various embodiments of the present disclosure introduce approaches to improve object recognition and computer vision through the use of florescent markings on items. In one embodiment, as inventory items arrive in a materials handling facility, they are sprayed or otherwise coated with a fluorescent marking solution. Such a solution allows the item to fluoresce, or glow, under the application of an ultraviolet light, or black light. When visible lights are dimmed in the facility and black lights are activated, items coated with the fluorescent marking solution can be seen to have a high contrast relative to its setting, e.g., tote walls, bin walls, shelves, etc. This artificially created contrast makes it easier for computer vision algorithms to automatically recognize the items and to control robotic arms relative to the items. Even in the situation where a robotic arm is manually operated remotely, the improved contrast via this technology would make it easier to discern the items via a video link. In the following discussion, a general description of the system and its components is provided, followed by a discussion of the operation of the same.

Figure 1A:
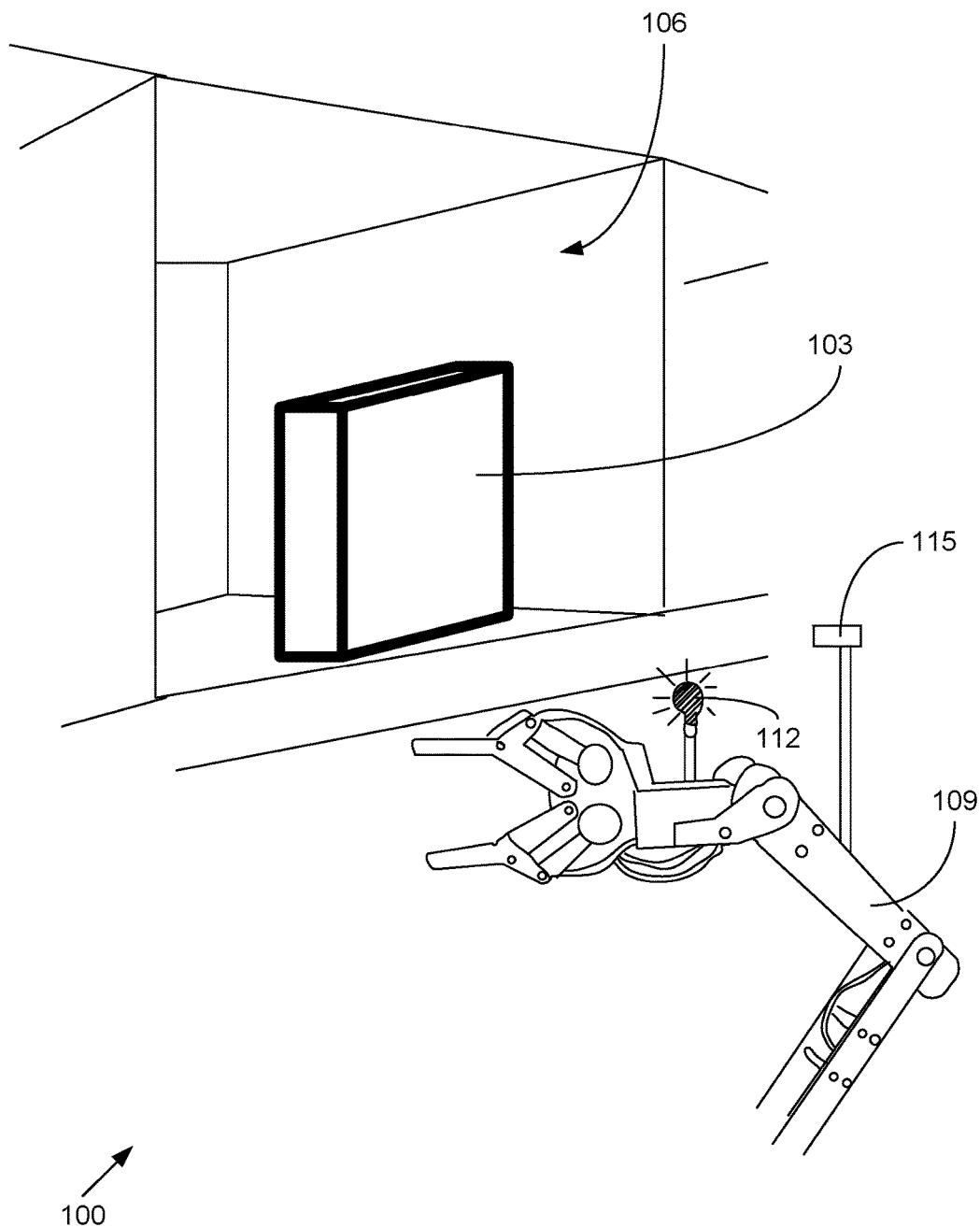
FIG. 1A is a drawing of a materials handling facility including an item stored in an item storage location according to various embodiments of the present disclosure.

Turning now to FIG. 1A, shown is a materials handling facility 100 including an item 103 stored in an item storage location 106. A materials handling facility 100 may include, but is not limited to, a warehouse, distribution center, cross-docking facility, order fulfillment center (also referred to as a "fulfillment facility"), packaging facility, shipping facility, or other facility or combination of facilities for performing one or more functions of material or inventory handling. The materials handling facility 100 may be configured to provide fulfillment of orders received for the items 103 that are purchased, rented, leased or otherwise consumed or requested, as will be described. Although the materials handling facility 100 is described herein with specific reference to a fulfillment center, it is understood that a materials handling facility 100 provides one example of many other types of environments to which the principles described herein apply.

The materials handling facility 100 may comprise, for example, a large warehouse or other structure that includes an inventory storage area having a plurality of item storage locations 106. To this end, the item storage locations 106 may comprise, for example, totes, bins, slots, shelves, containers, receptacles, drawers, trays, crates, stalls, cribs, cordoned areas, hooks, racks, or other locations in a storage unit. Zero or more items 103 are stored in each item storage location 106.

In this case, the item 103 has been coated with a fluorescent marking that creates fluorescence when activated by a particular radiation source, such as ultraviolet light. While the item 103 in this example is depicted as visible from a shelf, in other situations, the item 103 may be stored in a drawer, tray, bin, or other container that must first be removed or pulled out in order for the item 103 to be visible. Also in the materials handling facility 100 is a robotic arm 109. The robotic arm 109 may be assigned a task in the materials handling facility 100 to retrieve the item 103 from the item storage location 106. In some scenarios, the item 103 coated with the fluorescent marking may correspond to a container configured to store other items 103, such as a tote or basket.

In order to recognize the item 103, an ultraviolet light source 112 of the robotic arm 109 is activated. The ultraviolet light source 112 may comprise a black light or other ultraviolet light source. Since the item 103 has the fluorescent marking, the item 103 emits visible light via fluorescence due to the ultraviolet light from the ultraviolet light source 112. The surroundings in the item storage location 106 are not given the fluorescent marking, and the material comprising the item storage location 106 can be selected to have a low fluorescence. Thus, a high contrast between the item 103 and the item storage location 106 is achieved. In one embodiment, the visible lighting in the materials handling facility 100 near the item storage location 106 is dimmed or turned off in order to enhance the contrast provided by the fluorescence.

An image capture device 115 captures one or more images for analysis. Computer vision algorithms may be used to automatically recognize the item 103 in its environment and to cause the robotic arm 109 to operate relative to the item 103. Alternatively, the images from the image capture device 115 may be provided to a manual operator, who can then direct the robotic arm 109 appropriately. In some scenarios, specific markings or fiducials may be provided in the fluorescent marking on the item 103 in order to properly direct the robotic arm 109 with respect to the orientation of the item 103.

Figure 1B:
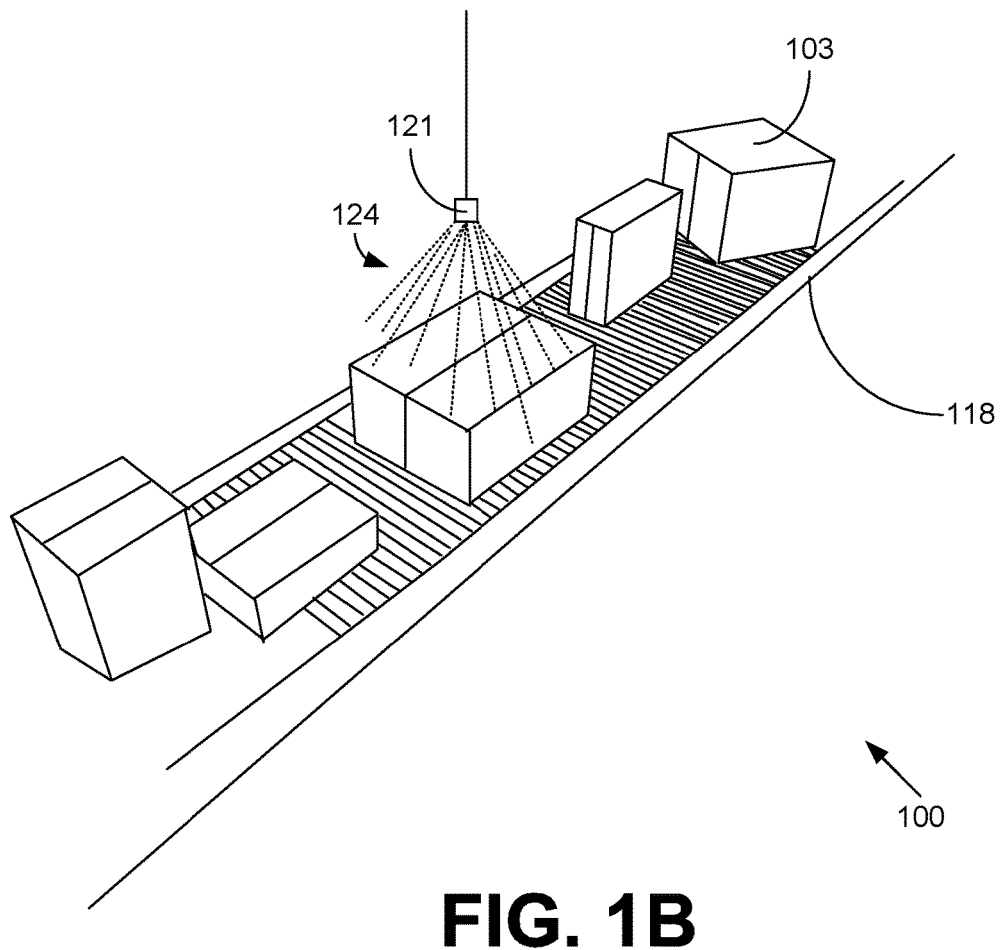
FIG. 1B is a drawing of another view of a materials handling facility that includes a conveyor according to various embodiments of the present disclosure.

Moving on to FIG. 1B, shown is another view of a materials handling facility 100 that includes a conveyor 118. As items 103 move along the conveyor 118, they pass through an application device 121 that applies a coating 124 to the items 103. For example, the application device 121 may spray a florescent ink on the outer packaging of the items 103, brush a liquid onto the outer packaging, stamp fiducials formed of the coating 124 onto the outer packaging, and/or perform other types of application.

The coating 124 may be selected to be unobtrusive or substantially invisible under normal visible lighting conditions. The items 103 may pass through multiple conveyors 118 or under multiple application devices 121 to ensure that multiple sides of the items 103 are sufficiently coated. In other embodiments, items 103 may be wrapped with an outer packaging that is inherently fluorescent in nature or to which a fluorescent coating has already been applied.

Figure 2:
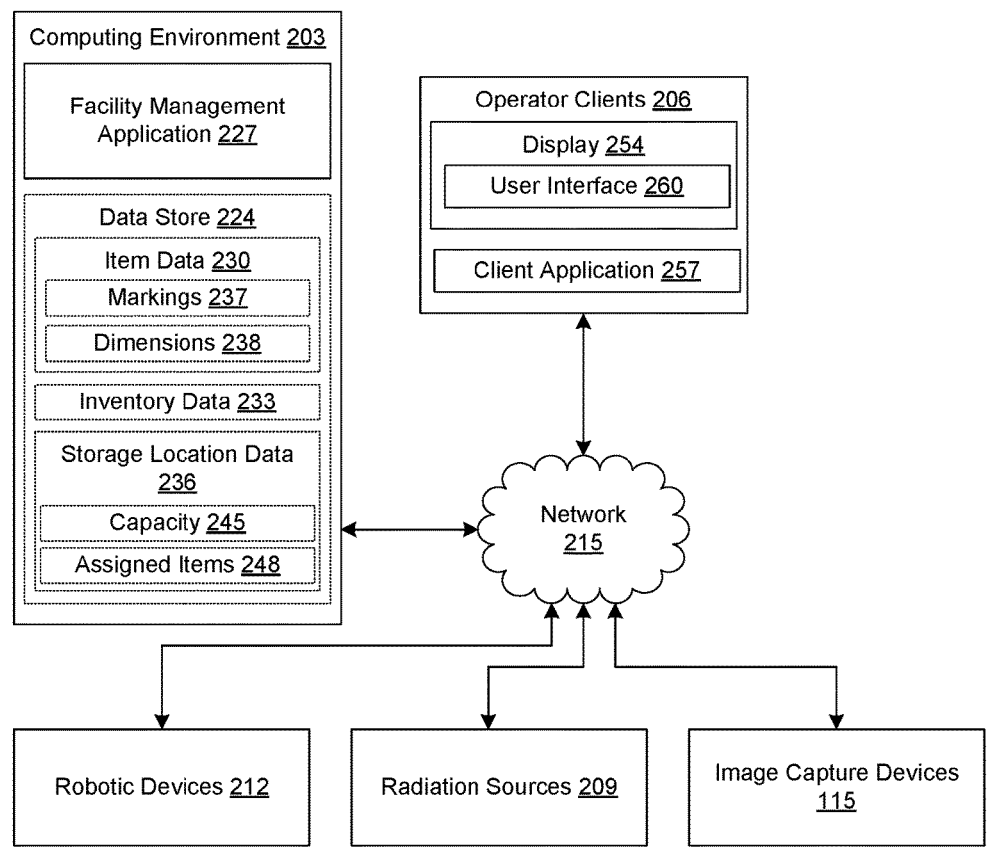
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more operator clients 206, one or more image capture devices 115, one or more radiation sources 209, and one or more robotic devices 212, which are in data communication with each other via a network 215. The network 215 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

The components executed on the computing environment 203, for example, include a facility management application 227 and other applications, services, processes, systems, engines, or functionality not discussed in detail herein. The facility management application 227 is executed to direct the operation of a materials handling facility 100. To this end, the facility management application 227 may maintain a data representation of all of the items 103 and item storage locations 106 within the facility. The facility management application 227 may track the current locations of items 103 and then assign the items 103 to item storage locations 106 using algorithms, for example, that solve or approximately solve the generalized assignment problem or the knapsack problem.

The facility management application 227 may receive notifications of inbound items 103, assign the inbound items 103 to specific item storage locations 106, cause items 103 to be marked with a fluorescent marking, cause items 103 to be placed in item storage locations 106 via robotic devices 212, receive notifications of item orders or shipments, cause items 103 to be retrieved from their item storage locations 106 via robotic devices 212, collated and sorted, and ultimately packaged for shipment. The facility management application 227 may instruct or direct automated equipment such as robotic devices 212 to carry out various item movements within the facility.

In various embodiments, the facility management application 227 may control the radiation sources 209, which may be activated or deactivated. The facility management application 227 may also perform computer vision recognition upon images captured by the image capture devices 115 in order to direct the robotic devices 212 or manual agents.

The data stored in the data store 224 includes, for example, item data 230, inventory data 233, storage location data 236, and potentially other data. The item data 230 contains various characteristic information about items 103, which may include title, weight, handling requirements (e.g., orientation requirements, fragility management requirements, hazardous handling requirements, and so forth), expiration information, temperature requirements, humidity requirements, value, and/or other information. In particular, the item data 230 may include information related to markings 237 that have been applied or will be applied to the items 103, as well as dimensions 238 of the items 103.

The inventory data 233 contains data regarding an inventory of items 103 at one or more materials handling facilities 100, inbound items 103 in transit or to be shipped to the materials handling facilities 100 in the future, outbound items 103 to be shipped to customers, and other information. The inventory data 233 may track items 103 across various business processes and areas in the materials handling facility 100, including receiving, stowing, picking, sorting, packing, and so forth.

The storage location data 236 contains information about item storage locations 106 in a materials handling facility 100. The item storage locations 106 may include totes, baskets, staging areas, sortation areas, as well as long-term storage areas with storage units. Information in the storage location data 236 may include a capacity 245, assigned items 248, and/or other data. The capacity 245 may define a dimensional capacity as well as a weight capacity for an item storage location 106. For example, a shelf may allow for storage of up to fifty pounds in an area two feet wide by one foot tall by one foot deep. The assigned items 248 track the assignments of items 103 to an item storage location 106. The assignment may be tentative, confirmed, or invalidated.

The operator clients 206 are representative of a plurality of client devices that may be coupled to the network 215. The operator clients 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The operator clients 206 may include a display 254. The display 254 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The operator clients 206 may be configured to execute various applications such as a client application 257 and/or other applications. The client application 257 may be executed in an operator client 206, for example, to access network content served up by the computing environment 203 and/or other servers, thereby rendering a user interface 260 on the display 254. To this end, the client application 257 may comprise, for example, a browser, a dedicated application, etc., and the user interface 260 may comprise a network page, an application screen, etc. For example, the client application 257 may render a user interface 260 that that allows a user to perform a certain task via remote control of a robotic device 212, like retrieving an item 103 from a particular item storage location 106 or storing an item 103 to a particular item storage location 106, as well as viewing images from the image capture devices 115. The operator clients 206 may be configured to execute applications beyond the client application 257 such as, for example, email applications, social networking applications, word processors, spreadsheets, and/or other applications.

The radiation sources 209 may comprise ultraviolet light sources, infrared light sources, X-ray sources, and/or any other sources of radiation that are capable of inducing fluorescence on a coating 124 on an item 103. The radiation sources 209 may be situated within the materials handling facility 100 in numerous fixed locations, or the radiation sources 209 may be disposed on or near a robotic device 212.

The robotic devices 212 may comprise robotic arms 109, mechanical shoes on a conveyor, unmanned aerial vehicles such as drones, and/or any other mechanical device configured to effect movements of items 103. The robotic devices 212 may be used to pick items 103 from item storage locations 106, to stow items 103 in item storage locations 106, to divert an item 103 from a conveyor to an exit point, to transport an item 103 through the air, and/or perform other actions with respect to items 103.

The image capture devices 115 may include charge coupled devices (CCDs), photosensors, infrared sensors, ultraviolet sensors, and/or other sensors that are configured to capture images. In various embodiments, the image capture devices 115 may be optimized to capture the wavelengths of the florescence of a specific coating 124 in view of the radiation source 209. For example, where the fluorescence is in the blue spectrum, a CCD in the image capture device 115 may be configured with only blue wavelengths and not red or green wavelengths. The image capture devices 115 may be situated at several fixed locations in the materials handling facility 100 or may be disposed on or near the robotic device 212.

It is noted that the principles described herein may have application outside the confines of a materials handling facility 100. For example, a robotic device 212 corresponding to an unmanned aerial vehicle (UAV) may include a radiation source 209 and an image capture device 115. The UAV may fly at night and retrieve an item 103 based upon exposure of the item 103 to the radiation source 209 to cause fluorescence. The fluorescence thus enables the UAV to automatically distinguish the item 103 from its surroundings using computer vision algorithms.

Figure 3:
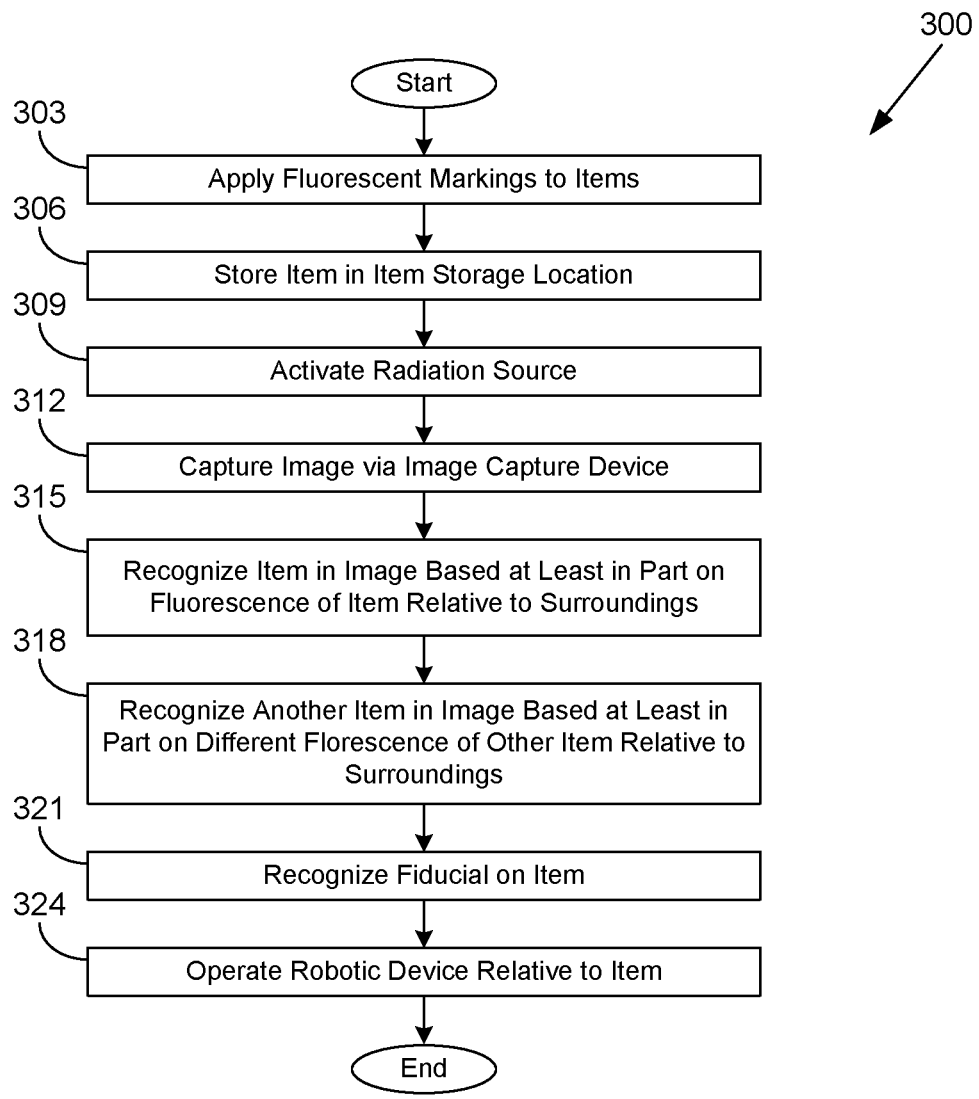
FIGS. 3 and 4 are flowcharts illustrating examples of functionality implemented as portions of a facility management application and/or other logic executed in the networked environment of FIG. 2 according to various embodiments of the present disclosure.

Referring next to FIG. 3, shown is a flowchart 300 that provides one example of the operation of a portion of the facility management application 227 and other logic according to various embodiments. It is understood that the flowchart of FIG. 3 provides merely an example of the many different types of functional arrangements that may be employed to implement the operation of the portion of the facility management application 227 and other logic as described herein. As an alternative, the flowchart of FIG. 3 may be viewed as depicting an example of elements of a method implemented in the networked environment 200 (FIG. 2) according to one or more embodiments.

Beginning with box 303, fluorescent markings are applied to items 103. The items 103 may undergo a coating process as described with reference to FIG. 1B, or the items 103 may be packaged or wrapped with an outer packaging that includes the fluorescent marking. Specific types of fluorescent markings or fiducials that indicate type of item 103 or orientation may be placed on the item 103. In some cases, the item 103 may be received at the materials handling facility 100 already bearing the fluorescent markings. For example, the fluorescent markings may be applied by the manufacturer or distributor. The fluorescent markings may be made of a coating that is designed to be substantially invisible under normal lighting conditions.

In box 306, an item 103 is stored in an item storage location 106. For example, an agent or a robotic arm 109 may store the item 103 in a tote, on a shelf, in a bin, or in some other item storage location 106. In box 309, a radiation source 209 in or near the item storage location 106 is activated. In other scenarios, the radiation source 209 may be always active or active at particular times. The radiation source 209 may be on or near a robotic device 212 or the image capture device 115. While the radiation source 209 is active, the normal visible lighting relative to item storage location 106 may be dimmed or inactive.

In box 312, the image capture device 115 captures one or more images of the item storage location 106. In one embodiment, the image capture device 115 may be optimized to capture a wavelength of a fluorescence of a marking. In box 315, the facility management application 227 may recognize the item 103 in the image(s) based at least in part on a fluorescence of the item 103 relative to its surroundings in the item storage location 106. The fluorescence is caused by exposure of the fluorescent marking of the item 103 to the radiation source 209. For example, the facility management application 227 may employ a computer vision algorithm to resolve the sides and/or edges of the item 103 in contrast to other items 103 or materials in the item storage location 106 that have no fluorescence or a differing fluorescence. The item data 230 may indicate expected dimensions 238 for the item 103 and/or expected markings 237 to aid in recognition.

In box 318, the facility management application 227 may recognize another item 103 in the image(s) based at least in part on a different fluorescence of the other item 103 relative to its surroundings, and relative to the item 103. The other item 103 may be recognized for purposes of distinguishing the item 103 or avoiding the other item 103. Some items 103 may lack a fluorescent marking, and an absence of such a marking may be information itself as to the identity of the item 103. In box 321, the facility management application 227 may recognize a fiducial on the item 103 as part of the fluorescent marking on the item 103.

In box 324, the facility management application 227 may operate a robotic device 212 relative to the item 103. For example, the facility management application 227 may command a robotic arm 109 or other device to pick up the item 103, to move the item 103, to stow the item 103, to divert the item 103, and so on. A robotic device 212 may be directed to singulate the item 103. Where a fiducial on the item 103 is recognized, the robotic device 212 may be operated using the orientation of the item 103 or other information encoded in the fiducial. Thereafter, the flowchart 300 ends.

Figure 4:
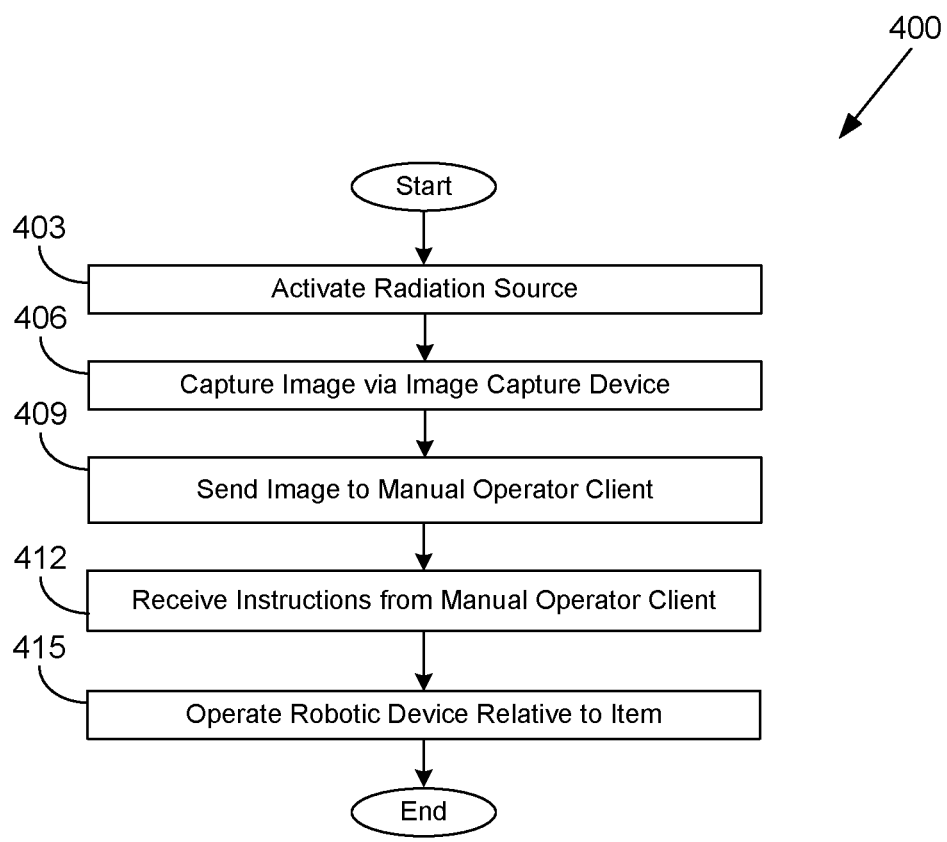

Referring next to FIG. 4, shown is a flowchart that provides one example of the operation of a portion of the facility management application 227 and other logic according to various embodiments. It is understood that the flowchart of FIG. 4 provides merely an example of the many different types of functional arrangements that may be employed to implement the operation of the portion of the facility management application 227 and other logic as described herein. As an alternative, the flowchart of FIG. 4 may be viewed as depicting an example of elements of a method implemented in the networked environment 200 (FIG. 2) according to one or more embodiments.

Beginning with box 403, a radiation source 209 in or near the item storage location 106 is activated. In other scenarios, the radiation source 209 may be always active or active at particular times. The radiation source 209 may be on or near a robotic device 212 or the image capture device 115. While the radiation source 209 is active, the normal visible lighting relative to item storage location 106 may be dimmed or inactive.

In box 406, the facility management application 227 receives one or more images captured via the image capture device 115. The images are of the item storage location 106 illuminated via the radiation source 209. In box 409, the images are sent to the operator client 206 for review by the manual operator of the robotic device 212. The manual operator can then easily see the item 103 in the image due to the fluorescence of the markings on the item 103 as compared with its surroundings.

In box 412, the facility management application 227 receives one or more instructions from the operator client 206 for manual operation of the robotic device 212. In box 415, the facility management application 227 causes the robotic device 212 to operate relative to the item 103. Thereafter, the flowchart 400 ends.

Although various operations in the flowcharts of FIGS. 3 and 4 are attributed to the facility management application 227, it is understood that some or all of these operations may be performed by control logic integrated into the robotic device 212, the image capture device 115, the operator client 206, and/or the radiation source 209. For example, logic in radiation source 209 may cause the radiation source 209 to become activated based on motion or presence of the robotic device 212.

Figure 5:
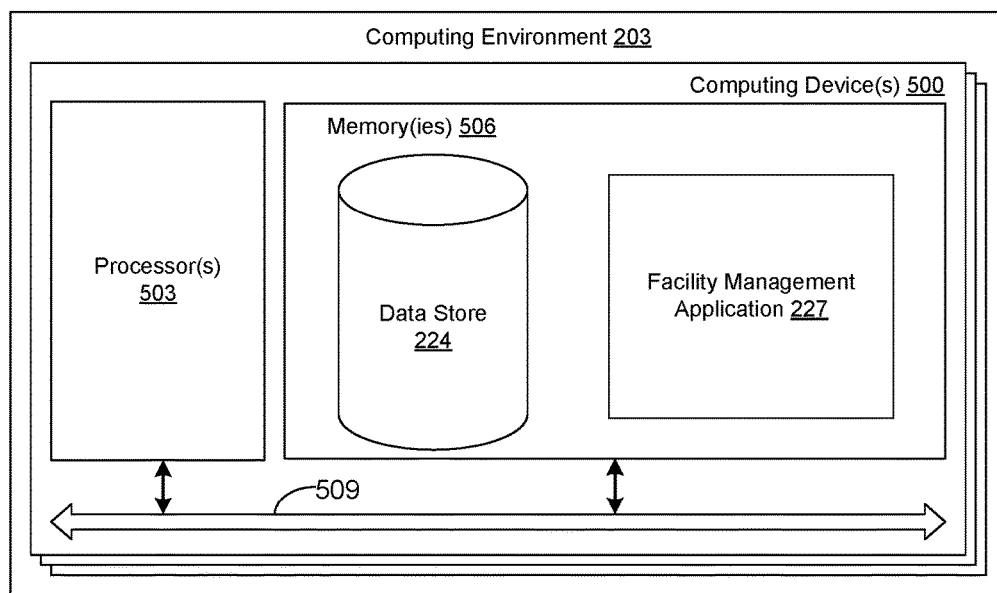
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 is the facility management application 227 and potentially other applications. Also stored in the memory 506 may be a data store 224 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the facility management application 227 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the facility management application 227 and other logic. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the facility management application 227, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the facility management application 227, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   coating substantially an entirety of at least one side of an item with a fluorescent marking using a sprayer;
   causing the item to be stored in an item storage location in a fulfillment center;
   activating an ultraviolet light source on or near a robotic arm;
   capturing an image via an image capture device of the robotic arm;
   recognizing, via at least one computing device, the item in the image based at least in part on a fluorescence of the item relative to the item storage location caused by exposure of the fluorescent marking of the item to the ultraviolet light source; and
   causing, via the at least one computing device, the robotic arm to retrieve the item from the item storage location in response to recognizing the item.

2. The method of claim 1, further comprising:
   recognizing, via the at least one computing device, a fiducial in the fluorescent marking; and
   operating, via the at least one computing device, the robotic arm based at least in part on the fiducial.

3. A method, comprising:
   capturing, via at least one computing device, an image;
   recognizing, via the at least one computing device, an item in the image based at least in part on a fluorescence of the item relative to its surrounding environment caused by exposure of a fluorescent marking of the item to a radiation source, wherein visible light sources are dimmed or turned off in the surrounding environment of the item when the image is captured; and
   causing, via the at least one computing device, a robotic device to operate relative to the item in response to recognizing the item.

4. The method of claim 3, wherein the robotic device comprises the radiation source.

5. The method of claim 4, wherein the robotic device corresponds to an unmanned aerial vehicle, and the unmanned aerial vehicle further includes an image capture device by which the image is captured.

6. The method of claim 3, wherein the item corresponds to a storage container configured to store one or more other items.

7. The method of claim 3, further comprising recognizing, via the at least one computing device, another item in the image based at least in part on a different fluorescence of the other item relative to its surrounding environment and the item.

8. The method of claim 3, wherein causing the robotic device to operate relative to the item further comprises directing, via the at least one computing device, a movement of the robotic device based at least in part on an orientation of the item indicated by a fiducial of the fluorescent marking.

9. The method of claim 3, wherein causing the robotic device to operate relative to the item further comprises directing, via the at least one computing device, a singulation of the item using the robotic device.

10. The method of claim 3, wherein a material of a storage location of the item has a low fluorescence as compared to the fluorescence of the item.

11. The method of claim 3, wherein the image is captured using an image capture device optimized for capturing a wavelength of radiation emitted by the fluorescent marking under exposure to the radiation source.

12. The method of claim 3, further comprising causing an outer packaging that includes the fluorescent marking to be applied to the item.

13. The method of claim 3, further comprising coating substantially an entirety of at least one side of an outer packaging of the item with a fluorescent coating.

14. The method of claim 3, wherein the fluorescent marking is substantially invisible under exposure to a visible light source.

15. A system, comprising:
   a device configured to apply a coating to substantially an entirety of at least one side of an item; and
   a robotic device configured to perform an operation relative to the item, the robotic device including a radiation source and an image capture device, the radiation source having a wavelength optimized to induce a fluorescence of the coating.

16. The system of claim 15, wherein the image capture device is optimized to capture the fluorescence of the coating.

17. The system of claim 15, further comprising at least one computing device configured to cause an image captured by the image capture device to be displayed to a remote operator of the robotic device.

18. The system of claim 15, further comprising at least one computing device configured to automatically recognize the item in an image captured by the image capture device and to automatically cause the operation of the robotic device.

19. The system of claim 15, wherein the radiation source is an ultraviolet light source.

20. The system of claim 15, wherein the device is configured to apply an outer packaging that includes the coating to the item.

* * * * *